United States Patent [19]
Hough

[11] Patent Number: 5,790,795
[45] Date of Patent: Aug. 4, 1998

[54] MEDIA SERVER SYSTEM WHICH EMPLOYS A SCSI BUS AND WHICH UTILIZES SCSI LOGICAL UNITS TO DIFFERENTIATE BETWEEN TRANSFER MODES

[75] Inventor: James K. Hough, Mountain View, Calif.

[73] Assignee: Sun Microsystems, Inc., Palo Alto, Calif.

[21] Appl. No.: 673,493

[22] Filed: Jul. 1, 1996

[51] Int. Cl.$^6$ .......................... G06F 13/14; H04N 7/173
[52] U.S. Cl. .................. 395/200.49; 395/200.47
[58] Field of Search ..................... 395/200.47, 200.49

[56] References Cited

U.S. PATENT DOCUMENTS

| | | | |
|---|---|---|---|
| 4,755,872 | 7/1988 | Bestler et al. | 358/86 |
| 4,829,372 | 5/1989 | McCalley et al. | 358/86 |
| 5,544,313 | 8/1996 | Shachnai et al. | 395/200.49 |
| 5,553,005 | 9/1996 | Voeten et al. | . |
| 5,572,442 | 11/1996 | Schulhof et al. | 395/200.49 |
| 5,583,995 | 12/1996 | Gardner et al. | 395/200.49 |
| 5,592,626 | 1/1997 | Papadimitriou et al. | 395/672 |
| 5,600,573 | 2/1997 | Hendricks et al. | 395/200.49 |
| 5,640,194 | 6/1997 | Suzuki et al. | 348/7 |

*Primary Examiner*—Krisna Lim
*Attorney, Agent, or Firm*—Conley, Rose & Tayon; Jeffrey C. Hood

[57] ABSTRACT

A media server system including a media server coupled through a SCSI bus to one or more MPEG decoder boxes. Each of the MPEG decoder boxes includes a plurality of data channels and is adapted to receive encoded MPEG data from the computer system. The computer system generates data transfers to the respective MPEG decoder boxes for transfer on the selected channels. The computer system is configurable according to various file storage formats, including file systems which prepend a header comprising channel information to the video data, and file systems which do not prepend a header comprising channel information to the video data. According to the present invention, the computer system assigns a first SCSI logical unit number, preferably LUN 0, to a SCSI bus data transfer if the data being transferred includes a header comprising channel information. The computer system assigns a SCSI logical unit number which corresponds to the destination channel if the data transfer does not include a header including channel information. Each of the MPEG decoder boxes examines received data from the computer system and uses the SCSI logical unit number comprised in the data to determine the channel. If the LUN is 0, the MPEG decoder box examines the header in the received data and determines the channel from the header. If the LUN is other than 0, the MPEG decoder box determines the channel based on the LUN number. Therefore, the present invention allows the MPEG decoder box to operate with different file systems.

28 Claims, 7 Drawing Sheets

5,790,795

1

MEDIA SERVER SYSTEM WHICH EMPLOYS A SCSI BUS AND WHICH UTILIZES SCSI LOGICAL UNITS TO DIFFERENTIATE BETWEEN TRANSFER MODES

FIELD OF THE INVENTION

The present invention relates to media server and/or video server systems, and more particularly to a media server system comprising a video server coupled through a SCSI bus to one or more MPEG decoder blocks, wherein the system utilizes SCSI logical unit addressing to identify channels in order to accommodate different file system architectures.

DESCRIPTION OF THE RELATED ART

Video-on-demand or video delivery systems enable a plurality of subscribers or users to selectively watch movies or other audio/video sequences which are stored on one or more video servers or media servers. The video servers are connected through data transfer channels to the plurality of subscribers or users. The video servers store a plurality of movies or other audio/video sequences, and each user can select one or more movies from the video servers for viewing. Each user includes a television or other viewing device, as well as associated decoding logic, for selecting and viewing desired movies. When a user selects a movie, the selected movie is transferred on one of the data transfer channels to the television of the respective user.

Full-motion digital video requires a large amount of storage and data transfer bandwidth. Thus, video-on-demand systems use various types of video compression algorithms to reduce the amount of necessary storage and data transfer bandwidth. Current video-on-demand systems use MPEG or MPEG-2 encoding in order to reduce the required data transfer bandwidth. Thus, audiovisual sequences, such as movies or other content, are stored on the media server in an MPEG compressed format, and the audiovisual sequence is decoded and typically converted to analog format for display and/or transmission to a user.

One type of media server design comprises a video server computer system which stores a plurality of encoded data streams, wherein this computer system is coupled through a SCSI (Small Computer Systems Interface) bus to one or more MPEG decoder blocks. Each of the MPEG decoder blocks are in turn coupled to video encoders and/or codecs (coder/decoders) for producing analog baseband data. Respective modulators may also be provided for modulating the data with a carrier frequency to produce band pass signals, such as UHF or VHF signals, or cable TV signals.

Media servers generally use a file system to store the video or media streams. Examples of a file system include the UNIX file system (UFS), the media file system (MFS) developed by Sun Microsystems, and the Windows NT file system developed by Microsoft Corporation, among others. Certain file system, such as the UNIX file system, incorporate or prepend header information to data, such as video data, which includes a function code as well as a channel number associated with the data. Other file systems, such as the media file system, do not prepend a header which includes this information to video data. Thus, if an MPEG decoder block is designed to accept data in a certain format, such as including or not including this prepended header, the MPEG decoder block typically will not work with the other type of file format. Therefore, an improved media server system and method is desired which includes MPEG decoder block logic that operates properly with different file system formats.

SCSI Bus Background

Background on the SCSI bus architecture is deemed appropriate. The SCSI bus is a peripheral expansion bus used for connecting peripheral I/O devices to a computer system. Various versions of the SCSI bus exist, including "Fast SCSI", "Wide SCSI", and "Fast/Wide SCSI". The Wide SCSI bus can accommodate up to 16 devices, including one or more host adapters and up to 15 other SCSI devices which are connected to the SCSI bus. The host adapter interfaces the computer system to the SCSI bus and controls operations on the SCSI bus.

Devices on the SCSI bus are classified as target devices or initiator devices. Some SCSI devices may function as both target and initiator devices. A SCSI host adapter is the most common example of an initiator. Common examples of SCSI target devices are disk drives and tape drives.

Each device connected to the SCSI bus includes a target ID or address. The target ID is used during arbitration and is asserted by its respective device to request ownership of the SCSI bus. The target IDs are also used during a selection phase in which a device winning arbitration of the SCSI bus selects another device on the SCSI bus for sending a command.

A bridge controller may be connected to the SCSI bus, wherein the bridge controller couples to one or more other devices, referred to as logical units, which interface through the bridge controller to the SCSI bus. One example of a bridge controller is a SCSI to SCSI bridge controller which interfaces a first SCSI bus to a second SCSI bus. The one or more logical units connected to the bridge controller each have logical unit numbers for identification. The SCSI specification provides for logical unit numbers 0 through 7.

In an exemplary SCSI protocol sequence in which a SCSI host adapter transfers data to a SCSI target, an initial bus free phase is followed by an arbitration phase. During the arbitration phase, each of the respective devices desiring to arbitrate for the bus, including the host adapter, asserts the data bit corresponding to its respective target ID. Once the host adapter wins arbitration, then, during a selection phase, the device which wins arbitration selects the target. After the selection phase, a message out (MSG_OUT) phase occurs, in which the host adapter sends an identify message and optional tag queue message and tag bytes to the target. The identify message includes three bits which identify the logical unit number (LUN) number for which the forthcoming command is destined. After the MSG_OUT phase, a command phase occurs.

During the command phase, the host adapter sends out a sequence of bytes referred to as the command descriptor block (CDB) to the target. The CDB includes information about the upcoming transfer. The first byte of the CDB includes an opcode which indicates whether the upcoming transfer is, for example, a read or write. The second byte of the CDB comprises three bits of logical unit information, i.e., the LUN number. The command descriptor block thus also includes three bits which identify the logical unit number.

After the command phase, a data out phase occurs in which the host adapter transfers the data specified in the CDB to the target. The target then sends a byte of status information to the host adapter during a status phase. Finally, the target sends a command complete message byte to the host adapter to indicate completion of the issued CDB and then releases the SCSI bus back to another bus free phase.

If the SCSI data transfer involves a device which is not a bridge device, then the logical unit number is set to zero.

However, if the transfer involves a bridge controller which couples to one or more devices which have logical unit numbers, then the three bits of information in the identify message and the second byte of the CDB include the logical unit number of the respective device involved in the transfer.

SUMMARY OF THE INVENTION

The present invention comprises a media server system including a media server coupled through a SCSI bus to one or more MPEG decoder boxes. Each of the MPEG decoder boxes includes a plurality of data channels and is adapted to receive encoded MPEG data from the computer system. The computer system generates data transfers to the respective MPEG decoder boxes for transfer on the selected channels. The computer system is configurable according to various file storage formats, including file systems which prepend a header comprising channel information to the video data, and file systems which do not prepend a header comprising channel information to the video data.

According to the present invention, the computer system utilizes the SCSI bus LUN field to indicate the presence or absence of a header comprising channel information. The computer system also utilizes the SCSI bus LUN field to provide channel information when no header is included. In the preferred embodiment, the computer system assigns a first logical unit number, preferably LUN 0, to a SCSI bus data transfer if the data being transferred includes a header comprising channel information. The computer system assigns a logical unit number which corresponds to the destination channel if the data transfer does not include a header including channel information.

Each of the MPEG decoder boxes examines received data from the computer system and determines the logical unit number comprised in the data. If the LUN is 0, the MPEG decoder box examines the header in the received data and determines the channel from the header. If the LUN is other than 0, the MPEG decoder box determines the channel based on the LUN number. Therefore, the present invention allows the MPEG decoder box to seamlessly operate with different file system formats.

BRIEF DESCRIPTION OF THE DRAWINGS

A better understanding of the present invention can be obtained when the following detailed description of the preferred embodiment is considered in conjunction with the following drawings in which.

Figure 1:
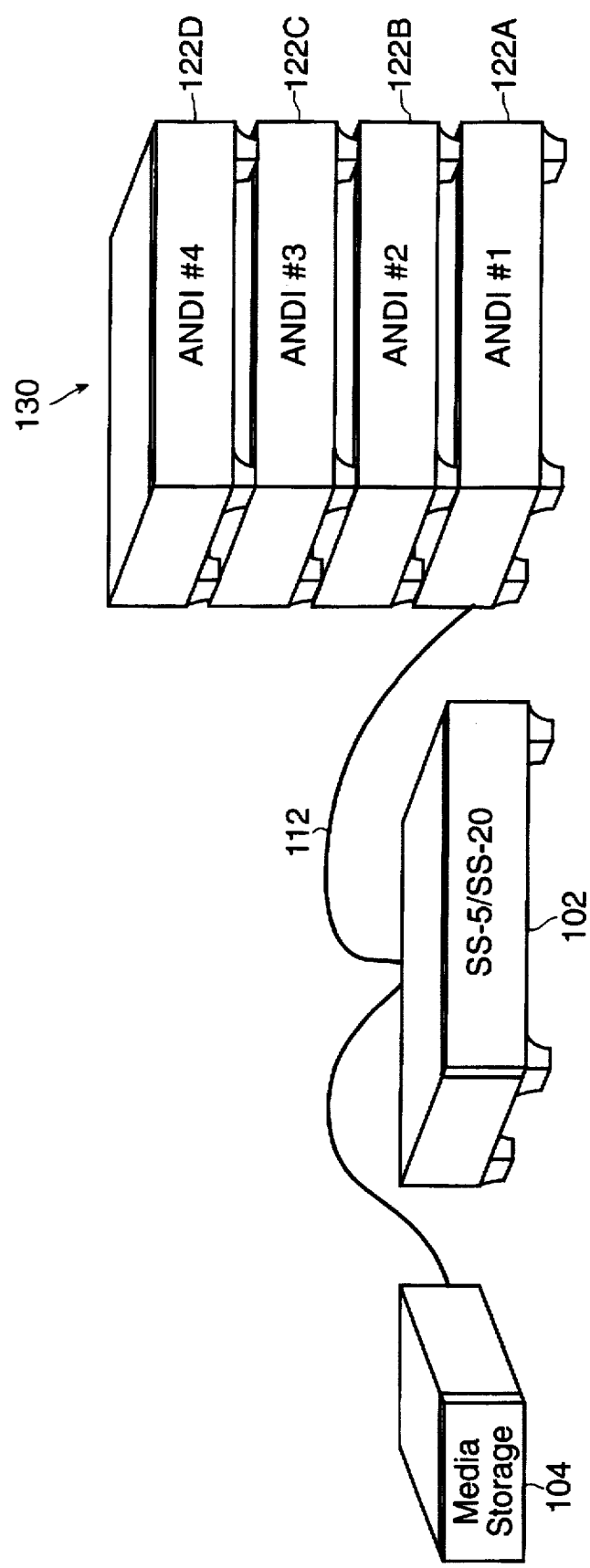
FIG. 1 illustrates a media server system according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary the intention is to cover all modifications equivalents and alternatives solely within the spirit and scope of the present invention, as defined by the appended claims.

DETAILED DESCRIPTION OF THE PREFERRED EMBODIMENT

Referring now to FIG. 1, a diagram illustrating the media server system according to one embodiment of the present invention is shown. As shown, the media server system includes a computer system unit 102. The computer system unit 102 is preferably the Sun SS-5 or Sun SS-20 computer produced by Sun Microsystems, and is preferably based on the UltraSparc processor. The computer system unit 102 may include one or more various types of storage devices including a RAID (redundant array of inexpensive disks) disk array, one or more digital video disks, or other memory or media storage as desired. Alternatively, or in addition, the computer system unit 102 may couple to a disk array storage device 104, as shown. The computer system 102 may also include a monitor (not shown).

The various media storage devices comprised in the computer system unit 102 or coupled to the system unit 102 preferably store compressed data streams. In the preferred embodiment, the data streams are MPEG-2 compressed streams. However, it is noted that any of various types of data or video compression may be used as desired.

The computer system unit 102 couples to one or more MPEG decoder boxes 122 as shown. In the embodiment shown, the computer system unit 102 couples to four MPEG decoder boxes 122A–122D. Each MPEG decoder box 122 preferably comprises 6 MPEG channels. The group of four MPEG decoder boxes 122A–122D collectively comprises a 24 channel decoder unit 130. As shown, the MPEG decoder boxes 122A–122D are preferably configured in a rack mounted configuration, wherein the plurality of MPEG decoder boxes 122 are mounted one on top of each other. The MPEG decoder boxes 122 are preferably connected in a daisy chained manner.

The computer system unit 102 preferably couples to a first one of the respective MPEG decoder boxes 122A through the Small Computer Systems Interface (SCSI) bus or cable 112. As is well known, the SCSI bus is a peripheral device bus wherein a plurality of devices may be connected to the bus in a daisy chained manner. The SCSI bus may be the Fast SCSI bus or the Wide SCSI bus or a Fast/Wide SCSI bus, as is well known in the art. As shown, the computer system unit 102 couples to a first MPEG decoder box 122A, and the remaining MPEG decoder boxes 122 are in turn daisy chained together. The computer system 102 includes a SCSI host adapter (not shown) which couples through a SCSI cable to the MPEG decoder box 122A.

Figure 2:
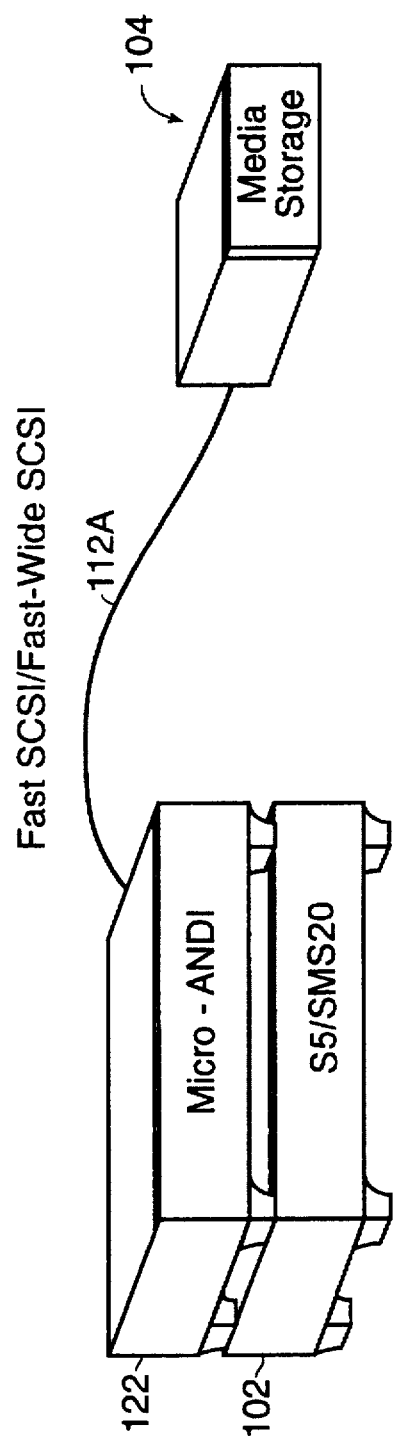
FIG. 2 illustrates a media server system according to another embodiment of the invention.

Referring now to FIG. 2, an alternate embodiment of the media server system is shown. In the embodiment of FIG. 2, a single MPEG decoder 122 is connected to the media server system unit 102. The single MPEG decoder 122 and the media server system unit 102 are preferably physically configured in a rack mounted configuration. Although not shown in FIG. 2, the MPEG decoder 122 couples to the media server system unit 102 through a SCSI connection or SCSI cable. The media server system unit 102 may in turn couple to a disk array media storage unit 104 or other type of storage unit, preferably through a Fast SCSI bus, or Fast-Wide SCSI bus cable 112A, as shown.

Figure 3:
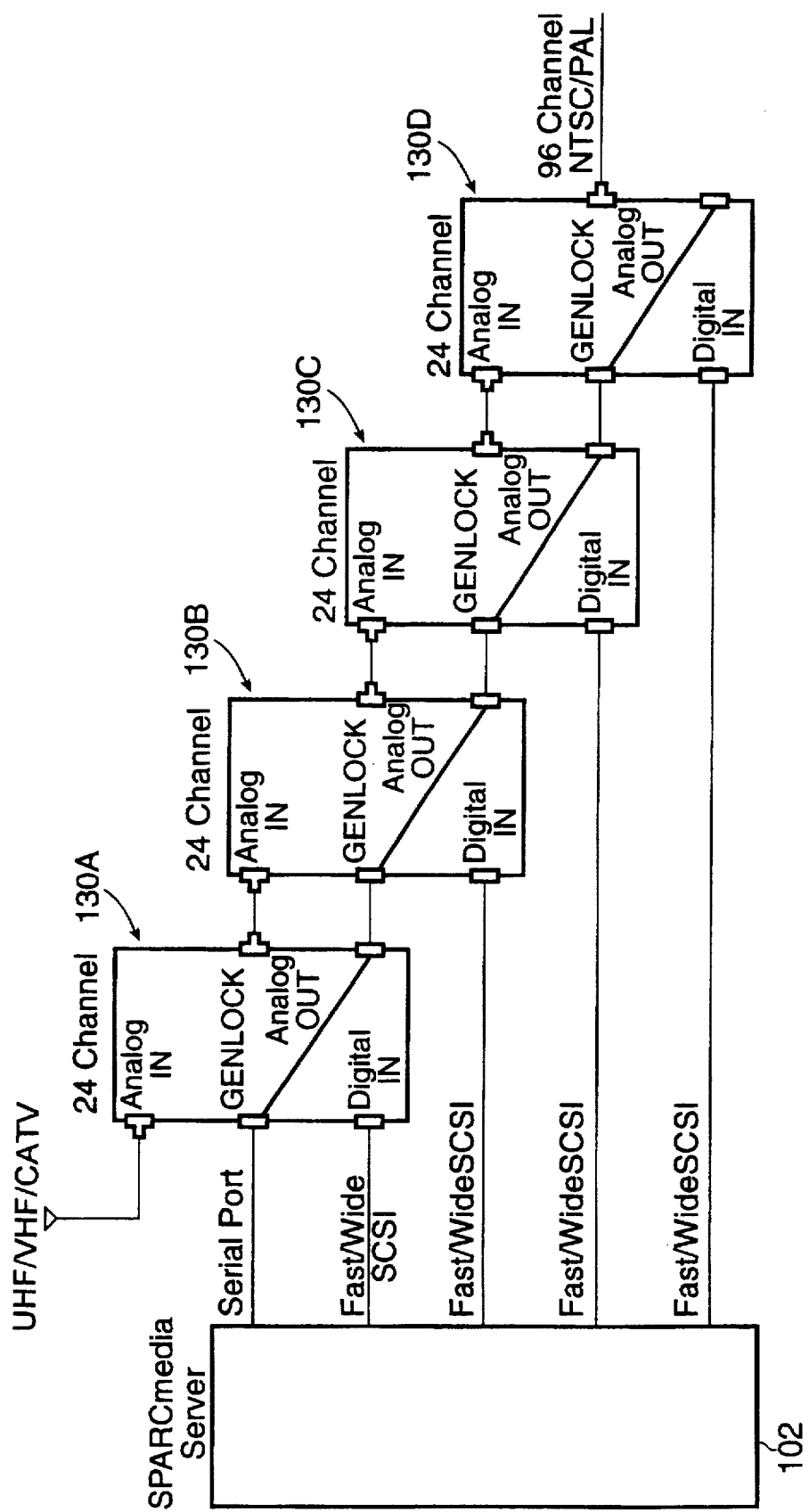
FIG. 3 illustrates a media server system which includes a plurality of 24 channel MPEG decoder units forming a 96 channel system.

Referring now to FIG. 3, a block diagram illustrating a media server system according to another embodiment is shown. This embodiment includes four 24 channel MPEG decoder units 130 labeled 130A–130D. In FIG. 3, each of the 24 channel MPEG decoder units 130 comprises the four MPEG decoder boxes 122A–122D connected or daisy chained together as shown in FIG. 1. In the embodiment FIG. 3, four 24 channel MPEG decoder units 130 are daisy chained together to produce a 96 channel system. Thus the embodiment of FIG. 3 comprises 16 MPEG decoder boxes 122.

As shown in FIG. 3, in this embodiment the media server system unit 102 includes a plurality of output ports, preferably four output ports, which provide Fast/Wide SCSI bus connectivity. Each of the SCSI bus connector ports is adapted to couple to a digital input of one of the respective 24 channel MPEG decoder units 130A–130D as shown. As shown, the media server system unit 102 also includes a serial output port which couples to an input port of one of the respective MPEG decoder units 130A. The respective MPEG decoder unit 130A which receives the serial output from the media server system unit 102 includes an analog output which is provided to a corresponding analog input of a subsequent MPEG decoder unit 130B. This respective MPEG decoder unit 130B in turn provides an analog output to an analog input of a subsequent MPEG decoder unit 130C. Finally, the MPEG decoder unit 130C provides a corresponding analog output to an analog input of the last MPEG decoder unit 130D. Thus, each of the MPEG decoder units 130A–D are daisy chained together through the serial output of the media server system unit 102. The last MPEG decoder unit 130D in the daisy chain provides a 96 channel output, i.e., an output signal which comprises up to 96 video streams or channels of video or audiovisual content, including television programming content.

The analog output of the MPEG decoder unit 130D may be comprised in various formats. In one embodiment, the analog output conforms to the National Television Standards Committee (NTSC) standard for analog video. In an alternate embodiment, the analog output corresponds to the European PAL format.

As shown in FIG. 3, the first MPEG decoder unit 130A also preferably includes an analog input port for receiving an analog input signal. As shown, this analog input signal may comprise a UHF or VHF signal, or a cable TV signal.

Figure 4:
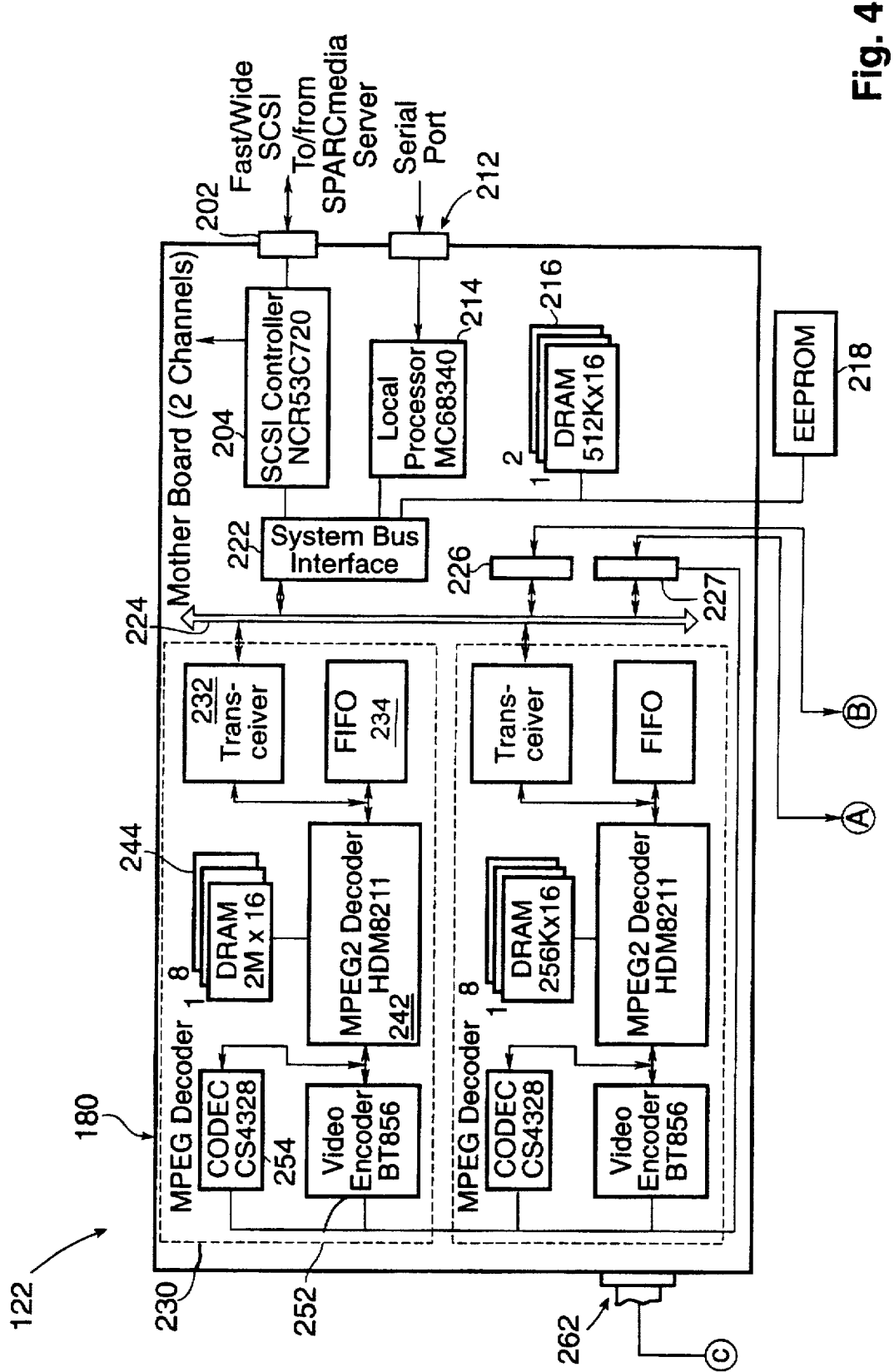
FIG. 4 is a block diagram illustrating the MPEG decoder box of FIG. 1.
Figure 4:
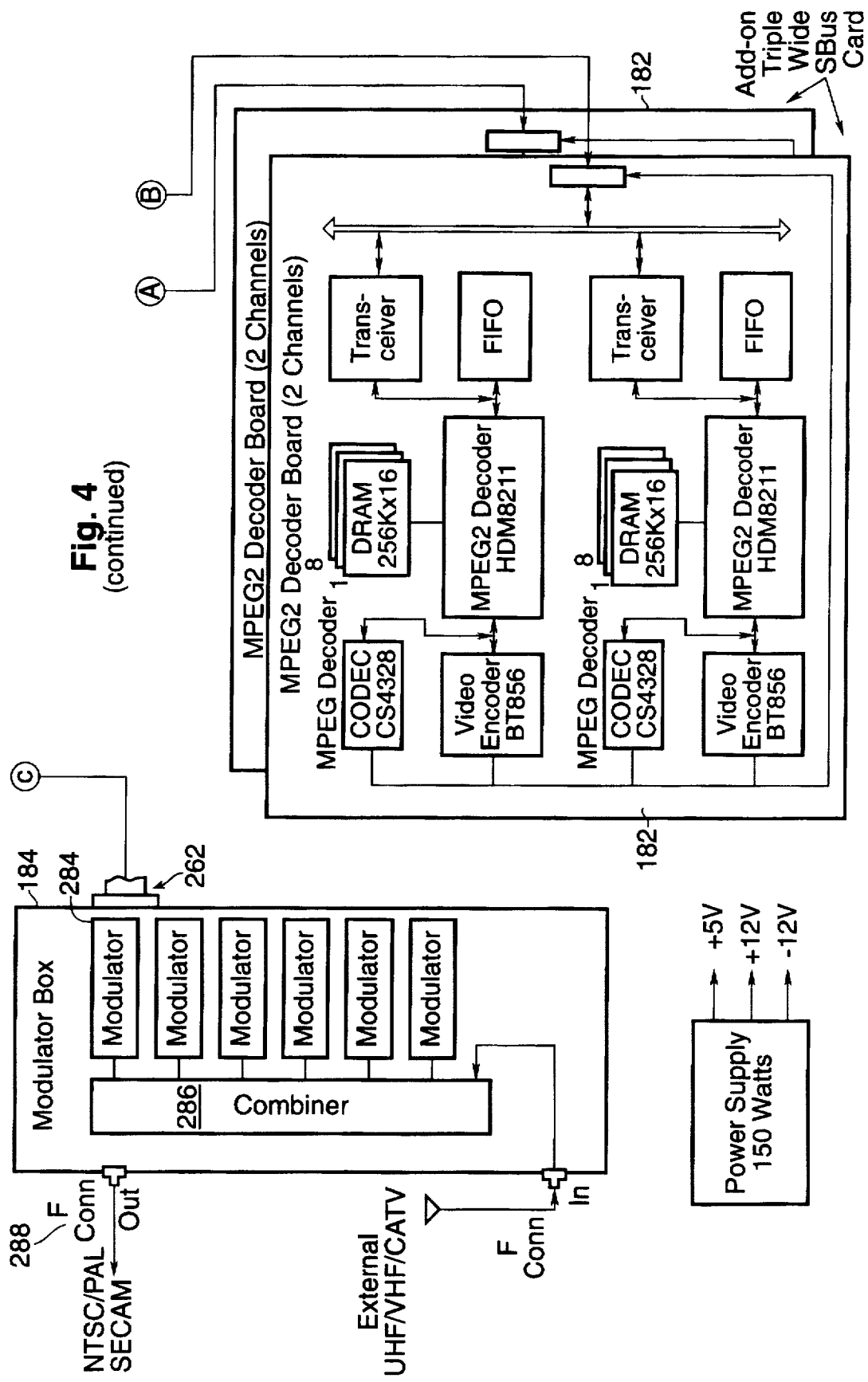

FIG. 4—MPEG Decoder Box Block Diagram

Referring now to FIG. 4, a block diagram illustrating one of the MPEG decoder boxes 122 is shown. As shown, each MPEG decoder box 122 includes an MPEG decoder board 180. The MPEG decoder board 180 includes two expansion slots 226 and 227 for receiving up to two MPEG decoder daughter cards 182. The MPEG decoder board 180 includes two MPEG channels, as shown. Each MPEG decoder daughter card 182 also includes two MPEG channels. Thus, when two MPEG decoder daughter cards 182 are inserted in the respective slots 226 and 227 of the MPEG decoder board 180, the MPEG decoder box 122 comprises 6 MPEG channels. The MPEG decoder box 122 also includes a modulator box 184 which is coupled to an output of the MPEG decoder board 180. The output of the MPEG decoder board 180 is a baseband signal. The modulator box 184 converts the output baseband signal to a passband signal, such as a UHF, VHF or cable TV signal.

Each MPEG decoder board 180 includes an input/output (I/O) port 202 for coupling to a SCSI bus. As noted above, in the preferred embodiment each MPEG decoder box 122 is adapted for coupling to a Fast/Wide SCSI bus. As also noted above, the SCSI bus I/O port is preferably used to couple through a SCSI bus to a respective media server system unit 102. The SCSI I/O port 202 couples to a SCSI controller 204. In the preferred embodiment, the SCSI controller is the NCR53C720 SCSI Controller produced by National Cash Register (NCR).

Each MPEG decoder box 122 also includes a serial port input for receiving serial data. The respective serial port input 212 couples to a local processor 214. In the preferred embodiment, the local processor 214 is the MC68340 processor produced by Motorola Corporation.

The SCSI controller 204 and the local processor 214 couple to a system bus interface 222. A memory, preferably dynamic random access memory (DRAM) 216, couples to the system bus interface 222. The DRAM is preferably 512K×16. A non-volatile memory 218, preferably an EEPROM (electrically erasable programmable ROM), is also coupled to the system bus interface 222. The EEPROM 218 stores firmware which controls the operation of the SCSI controller 204 according to the present invention. At power on, the firmware stored in the EEPROM 218 is loaded into the DRAM 216, and the firmware is then executed by the SCSI controller 204 from the DRAM 216.

As discussed below, the firmware directs the SCSI controller 204 to examine the Logical Unit # (LUN) during a video transfer and determine destination channel information, i.e., determine which of the six channels on which the data should be transferred. As discussed below, if the LUN is 0, then header information is included with the video data block which indicates the channel number. If the LUN is not 0, then no header is prepended, and the SCSI controller 204 uses the LUN to determine the appropriate MPEG channel.

The system bus interface 222 couples to a bus 224 as shown. The two MPEG decoder daughter card slots 226 and 227 are coupled to the bus 224. The bus is preferably the S-bus, but other bus types may be used. Two MPEG decoder logic blocks 230 are coupled to the bus 224. The MPEG decoder logic blocks 230 are preferably identical, and only one is described below for convenience.

As shown, each MPEG decoder logic block 230 includes a first transceiver 232 coupled to the system bus 224. A first in first out (FIFO) buffer 234 couples to the transceiver 232. Each of the transceiver 232 and FIFO buffer 234 couple to an MPEG-2 decoder block 242. A memory block 244, preferably 2M×16 DRAM, couples to the MPEG-2 decoder block 242. The MPEG-2 decoder block is preferably the HDM8211 produced by Hitachi.

The MPEG-2 decoder block 242 couples to a video encoder 252. The video encoder 252 includes analog to digital conversion logic and produces a baseband analog video signal. The MPEG-2 decoder block 242 also couples to an audio coder/decoder (codec) 254, which converts the digital audio portion of the decoded MPEG signal to analog audio signals. Each of the video encoder 252 and codec 254 are coupled through a bus to an input/output port 262 of the MPEG decoder board 180.

As mentioned above, one or more MPEG-2 decoder daughter cards 182 may be coupled to the system bus 224 for providing two additional stream processing channels. As shown, each MPEG-2 decoder daughter card 182 comprises two MPEG decoder logic blocks 230, as described above.

The analog I/O port 262 of the MPEG decoder board 180 preferably outputs a baseband analog signal comprising a plurality of data streams or channels. In the preferred embodiment of the invention, a modulator box 184 is coupled to the I/O outport 262 for converting the baseband analog signal to a band pass analog signal. As shown, the modulator box 184 comprises a plurality of modulators 284 for each of the respective channels. Each of the modulators 284 is coupled to a combiner 286 which combines the modulated systems into a single analog signal, such as a VHF or UHF signal, comprising a plurality of channels. The combiner 286 provides an output through a connector 288. The output may conform to any of various formats, including the NTSC format, the PAL format, or the SECAM format.

As shown, the modulator box 184 also includes an input for receiving a UHF, VHF or cable TV signal. The analog input is provided to the combiner 286 and is provided as a portion of the analog output from the I/O port 288.

Figure 5:
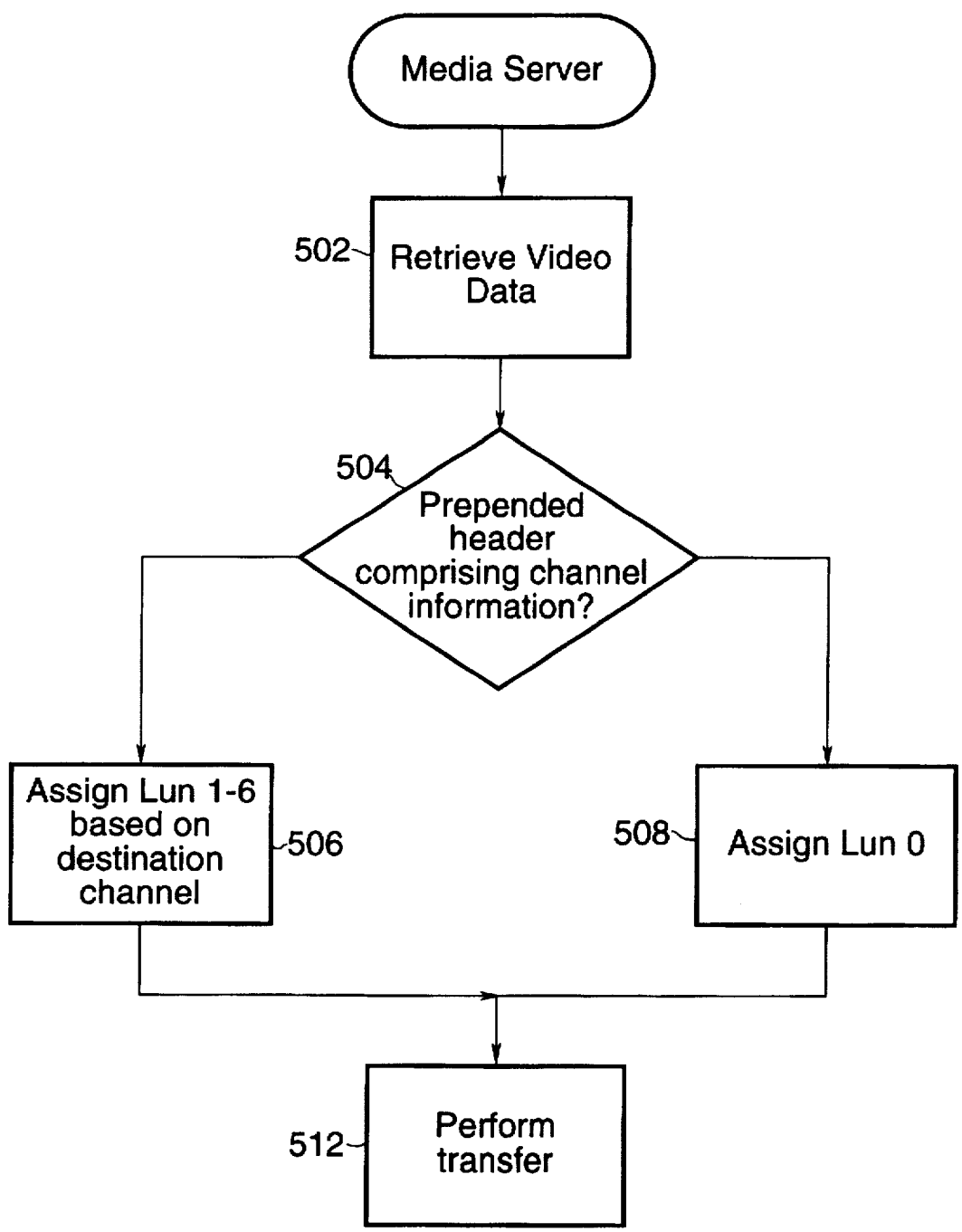
FIG. 5 is a flowchart diagram illustrating operation of the media server computer system performing a transfer.

FIG. 5—Flowchart Diagram of Media Server

Referring now to FIG. 5, a flowchart diagram illustrating operation of the computer system 102 according to the preferred embodiment of the invention is shown. As shown, when the computer system 102 is transferring video data or video streams to one of the MPEG decoder boxes 122, the computer system 102 first retrieves the data to be transmitted from the storage media.

The computer system 102 then determines in step 504 if the video data block includes a prepended header. As noted above, certain file systems, such as the UNIX file system, prepend header information to a video data block, wherein this header information includes the MPEG channel number and the number of bytes involved in the transfer. The MPEG channel number is necessary for the MPEG decoder box 122, which is a multi-channel MPEG decoder, to properly route the video data to the proper MPEG channel. However, other file systems, such as the media file system (MFS), do not provide for header information to be prepended to a video data block.

Therefore, in step 504 the computer system 102 determines if a prepended header is included with the video data block. If so, then in step 508 the host driver executing on the computer system 102 assigns logical unit zero (LUN 0), i.e., writes a 0 value in the LUN field of the command descriptor block of the transfer. As discussed further below, the LUN 0 value written into the command descriptor block indicates to the SCSI controller 204 in the MPEG decoder box 122 that the video data block includes a prepended header. The LUN 0 value is also preferably written into the identify message of the SCSI transfer.

Upon completion of step 508, the host server 102 performs other operations necessary to perform the transfer, and then in step 512 the server 102 performs the data transfer to the respective MPEG decoder box 122 based on the target ID of the respective box. Operation then completes.

If a prepended header is determined to not be included with the video data in step 504, then in step 506 the host driver executing in the computer system 102 assigns an LUN number in the command descriptor block which indicates the respective MPEG decoder destination channel. In the preferred embodiment, the computer system 102 assigns or writes one of LUNs 1–6, corresponding to one of the respective six channels of the MPEG decoder box 122. The channel data is thus encoded in the LUN field of the command descriptor block. The respective LUN number is also written into the identify message of the SCSI transfer.

Each of the LUNs 1–6 have a one-to-one correspondence with the respective MPEG channel number on the MPEG decoder box 122. As discussed above with reference to FIG. 4, the MPEG decoder box 122 includes at least two MPEG channels and may include up to six MPEG channels. Where a prepended header is not included, the MPEG channel number which is the destination for the data is written or encoded into the LUN field of the command descriptor block to enable the MPEG decoder box 122 to determine the channel number. After operation of step 506, the host server 102 performs other operations necessary to perform the transfer and then performs the data transfer in step 512.

Figure 6:
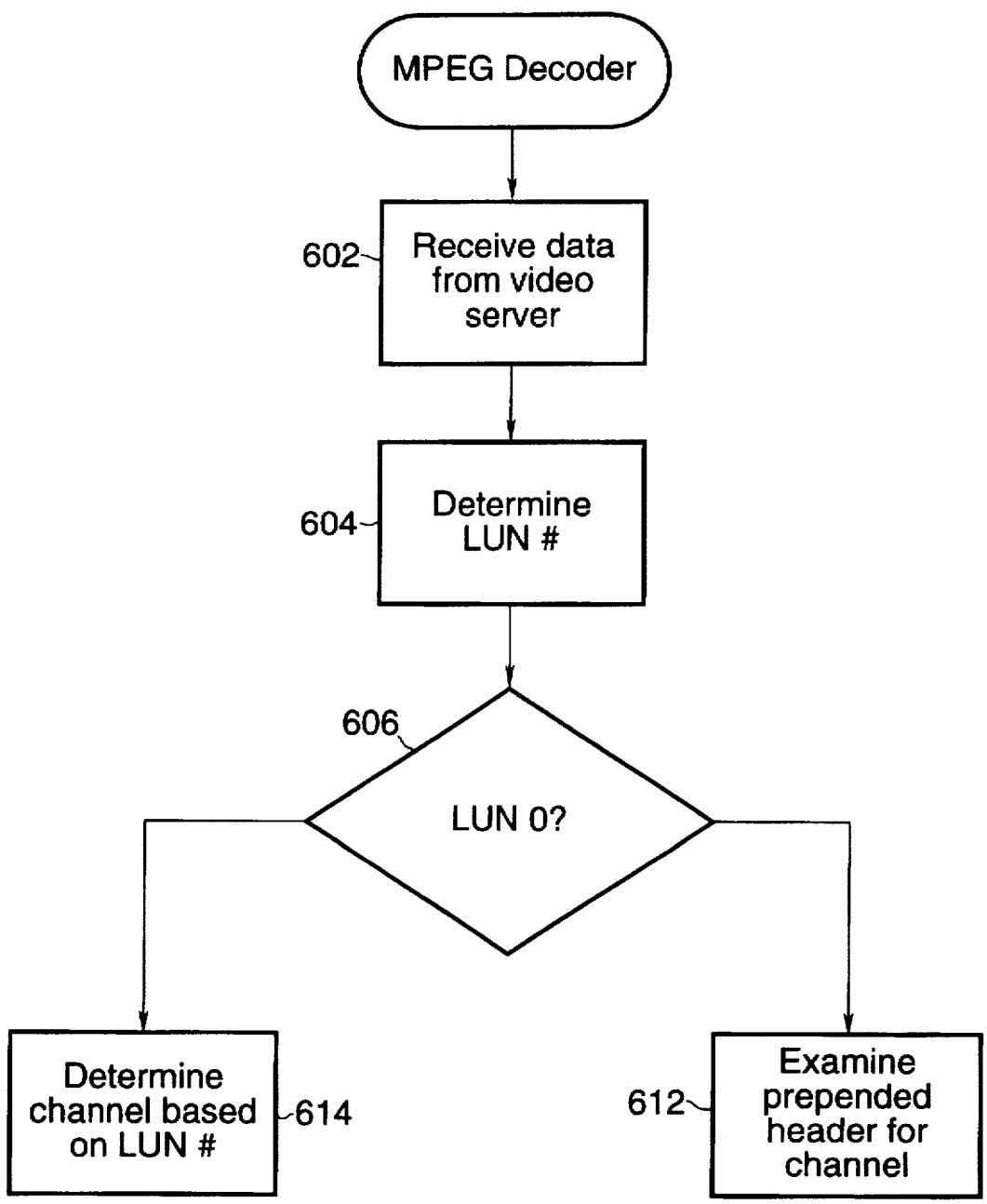
FIG. 6 is a flowchart diagram illustrating operation of the MPEG decoder.

FIG. 6—Flowchart Diagram of MPEG Decoder Box

Referring now to FIG. 6, a flowchart diagram illustrating operation of the SCSI controller 204 in a respective MPEG decoder box 122 is shown. As shown, in step 602 the MPEG decoder box 122 receives data from the video server 102. This video write data is received in step 602 by the respective MPEG decoder box 122 in response to a transfer performed in step 512 of FIG. 5. As discussed above, during a video data transfer, the video server will use a target ID or target address which indicates the respective MPEG decoder box 122 that is the destination for the video write being performed.

In step 604 the SCSI controller 204 in the respective MPEG decoder box 122 determines the logical unit number (LUN). The SCSI controller 204 preferably determines the LUN from the command descriptor block (CDB) of the SCSI transfer. The LUN number may also be determined from the identify message of the SCSI transfer.

If the logical unit number is determined to be zero in step 606, then this indicates that the video data involved in the transfer includes a prepended header. This prepended header identifies the transfer and also indicates the MPEG channel number which is the destination of the transfer. Thus, once the SCSI controller 204 detects a LUN 0 transfer in step 606, in step 612 the controller 204 decodes the header for the function, e.g., a video data write, and the MPEG channel on which the data is to be transferred.

If the SCSI controller 204 determines in step 606 that the logical unit number is not LUN 0, but rather is one of either LUN 1–6, then in step 614 the SCSI controller 204 uses the received LUN number as the MPEG channel associated with the transfer. Thus, if the LUN number in the command descriptor block is 1, then the SCSI control 204 interprets this as a video data transfer to be performed on MPEG channel 1. Similarly, if the LUN number is 2, then the MPEG channel on which the data is to be transferred is determined to be channel 2. Likewise, there is a one-to-one correspondence between LUNs 1–6 and MPEG channels 1–6 on a respective MPEG decoder box 122.

Therefore, the present invention comprises a system and method for encoding the presence or absence of prepended header information, as well as a channel number, on the logical unit number field in the command descriptor block of a SCSI transfer. This allows an MPEG decoder box 122 to operate with different file system formats, including file systems which either prepend header information or do not prepend header information.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A media server system, comprising:
   A) a computer system including:
      a) a memory media for storing data; and
      b) a SCSI host adapter for coupling to a SCSI bus;
      wherein the computer system is configured to generate data transfers, wherein the computer system is configured to assign a predetermined SCSI logical unit number to a SCSI bus data transfer if the data being transferred includes a header comprising channel information, and wherein the computer system is configured to assign a SCSI logical unit number different than said predetermined number to the data transfer if the data transfer does not include a header including channel information;

B) one or more decoder boxes, wherein each of said one or more decoder boxes includes a plurality of data channels, wherein each of said one or more decoder boxes is adapted to receive data from said computer system and transfer said received data on one of said plurality of channels; and C) a SCSI cable for connecting said computer system to said one or more decoder boxes;

wherein each of said one or more decoder boxes is configured to examine received data from the computer system and determine a logical unit number comprised in said data, wherein each of said one or more decoder boxes is configured to examine a header in said received data if said received data includes said predetermined logical unit number.

2. The media server system of claim 1, wherein the computer system is configured to selectively generate data transfers to said plurality of data channels in said one or more decoder boxes;

wherein, in a transfer of data to a specified channel of one of said one or more decoder boxes, the computer system is configured to include a logical unit number in the data transfer which corresponds to said specified channel of the data transfer if the data transfer does not include a header including channel information.

3. The media server system of claim 1, wherein the computer system is configured to selectively generate data transfers to each of said plurality of data channels in said one or more decoder boxes;

wherein, in a transfer of data to a specified channel of one of said one or more decoder boxes, the computer system is configured to encode said specified channel in a SCSI logical unit number field of the data transfer if the data transfer does not include a header including channel information.

4. The media server system of claim 1, wherein said computer system comprises:

means for determining if the data being transferred in a SCSI bus data transfer includes a header comprising channel information;

means for assigning a first logical unit number to said SCSI bus data transfer if the data being transferred includes said header; and means for assigning a SCSI logical unit number different than said predetermined number to the SCSI bus data transfer if the data being transferred does not include said header.

5. The media server system of claim 1, wherein each of said one or more decoder boxes comprises:

means for determining a SCSI logical unit number comprised in said received data;

means for examining a header in said received data if said SCSI logical unit number is said predetermined logical unit number; and means for determining channel information based on said SCSI logical unit number if said SCSI logical unit number is not said predetermined logical unit number.

6. The media server system of claim 1, wherein the computer system is configurable to operate according to two or more different file systems;

wherein the computer system is configured to include a header to data being transferred when said computer system is using a first file system architecture; and wherein the computer system is configured to not include a header to data being transferred when said computer system is using a second file system architecture.

7. The media server system of claim 1, wherein said predetermined logical unit number is 0.

8. The media server system of claim 1, wherein the computer system is configured to generate data transfers comprising multimedia data streams, wherein said multimedia data streams are MPEG compressed streams;

wherein each of said one or more decoder boxes comprises a plurality of MPEG decoders corresponding to a plurality of channels.

9. A method for transferring video data in a media server system comprising a video server, at least one decoder box comprising a plurality of channels, and a SCSI cable connecting the video server to the at least one decoder box, the method comprising:

the server reading data from a storage media;

the server configuring said data for transfer, wherein said configuring includes assigning a predetermined logical unit number if said data includes a header comprising channel information, and wherein said configuring includes assigning a logical unit number different than said predetermined number if said data does not include a header comprising channel information;

the server transferring said data to said at least one decoder box;

said at least one decoder box receiving said data;

said at least one decoder box determining the logical unit number comprised in said data;

said at least one decoder box examining a header in said data to determine channel information if said logical number is said predetermined logical unit number; and said at least one decoder box determining channel information from the logical unit number if said logical unit number is different than said predetermined number.

10. The method of claim 9, further comprising:

said at least one decoder box transferring said data on a specified channel based on said determined channel information.

11. The method of claim 10, wherein said configuring said data for transfer comprises including a logical unit number in the data transfer which corresponds to said specified channel of the data transfer if the data transfer does not include a header including channel information.

12. The method of claim 10, wherein said configuring said data for transfer comprises encoding said specified channel as said logical unit number in the data transfer if the data transfer does not include a header including channel information.

13. The method of claim 10, wherein said data includes a header comprising channel information, the method further comprising:

said at least one decoder box transferring said data on said specified channel of said plurality of channels based on said channel information comprised in said header.

14. The method of claim 10, wherein said data does not include a header comprising channel information, the method further comprising:

said at least one decoder box transferring said data on said specified channel of said plurality of channels based on channel information determined from the logical unit number.

15. The method of claim 10, wherein the server transferring said data to said at least one decoder box comprises the server transferring multimedia data streams data to said at least one decoder box, wherein said multimedia data streams are MPEG compressed streams:

wherein said at least one decoder box transferring said data on a specified channel based on said determined channel information includes MPEG decoding said data.

16. The method of claim 9, wherein the computer system is configurable to operate according to two or more different file systems;

wherein said configuring said data for transfer comprises including a header comprising channel information in data being transferred when said computer system is using a first file system; and wherein said configuring said data for transfer comprises not including a header comprising channel information in data being transferred when said computer system is using a second file system.

17. The method of claim 9, wherein said predetermined logical unit number is 0.

18. A media server system, comprising:

A) a computer system including:
    a) a memory media for storing data; and
    b) an adapter for coupling to a bus;
    wherein the computer system is configured to generate data transfers, wherein the computer system is configured to assign a predetermined logical unit number to a bus data transfer if the data being transferred includes a header comprising channel information, and wherein the computer system is configured to assign a logical unit number different than said predetermined number to the data transfer if the data transfer does not include a header including channel information;

B) one or more decoder boxes coupled to said computer system, wherein each of said one or more decoder boxes includes a plurality of data channels, wherein each of said one or more decoder boxes is adapted to receive data from said computer system and transfer said received data on one of said plurality of channels, wherein each of said one or more decoder boxes is configured to examine received data from the computer system and determine a logical unit number comprised in said data, wherein each of said one or more decoder boxes is configured to examine a header in said received data if said received data includes said predetermined logical unit number.

19. The media server system of claim 18, wherein the computer system is configured to selectively generate data transfers to said plurality of data channels in said one or more decoder boxes;

wherein, in a transfer of data to a specified channel of one of said one or more decoder boxes, the computer system is configured to include a logical unit number in the data transfer which corresponds to said specified channel of the data transfer if the data transfer does not include a header including channel information.

20. The media server system of claim 18, wherein the computer system is configured to selectively generate data transfers to each of said plurality of data channels in said one or more decoder boxes;

wherein, in a transfer of data to a specified channel of one of said one or more decoder boxes, the computer system is configured to encode said specified channel in a logical unit number field of the data transfer if the data transfer does not include a header including channel information.

21. A method for transferring video data in a media server system comprising a video server and at least one decoder box comprising a plurality of channels, wherein the video server is connected to the at least one decoder box, the method comprising:

the server reading data from a storage media;
  the server configuring said data for transfer, wherein said configuring includes assigning a first logical unit number if said data includes a header comprising channel information, and wherein said configuring includes assigning a logical unit number different than said first number if said data does not include a header comprising channel information;
  the server transferring said data to said at least one decoder box;
  said at least one decoder box receiving said data;
  said at least one decoder box determining the logical unit number comprised in said data;
  said at least one decoder box examining a header in said data to determine channel information if said logical number is a first logical unit number; and
  said at least one decoder box determining channel information from the logical unit number if said logical unit number is different than said first number.

22. The method of claim 21, further comprising:

said at least one decoder box transferring said data on a specified channel based on said determined channel information.

23. The method of claim 22, wherein said configuring said data for transfer comprises including a logical unit number in the data transfer which corresponds to said specified channel of the data transfer if the data transfer does not include a header including channel information.

24. The method of claim 22, wherein said configuring said data for transfer comprises encoding said specified channel as said logical unit number in the data transfer if the data transfer does not include a header including channel information.

25. The method of claim 22, wherein said data includes a header comprising channel information, the method further comprising:

said at least one decoder box transferring said data on said specified channel of said plurality of channels based on said channel information comprised in said header.

26. The method of claim 22, wherein said data does not include a header comprising channel information, the method further comprising:

said at least one decoder box transferring said data on said specified channel of said plurality of channels based on channel information determined from the logical unit number.

27. A video decoder box for decoding received compressed video data, wherein said video decoder box is adapted for coupling to a SCSI bus, wherein said decoder box includes a plurality of data channels, wherein said decoder box is adapted to receive data and transfer said received data on one of said plurality of channels, wherein said decoder box is configured to examine received data from the computer system and determine a SCSI logical unit number comprised in said data, wherein said decoder box is configured to examine a header in said received data if said received data includes said SCSI logical unit number is a predetermined number.

28. A media server system, comprising:

a storage device configured to store encoded audio/video data of varying file formats;

a host computer coupled to said storage device, wherein said storage device is configured to retrieve a first sequence of said encoded audio/video data from said storage device in response to a request for said first sequence of said encoded audio/video data;

a SCSI controller coupled to said host computer by a first bus;

a plurality of decoding channels coupled to said SCSI controller by a second bus, wherein each of said plurality of decoding channels is configured to decode said first sequence of said encoded audio/video data in response to receiving said first sequence of encoded audio/video data from said host computer via said SCSI controller;

and wherein said host computer is configured to examine said first sequence of encoded audio/video data to determine if header data is present, wherein said header data includes channel information;

wherein, if said header information is present, said host computer is configured to assign a predetermined SCSI logical unit number in transferring said first sequence of encoded audio/video data to said SCSI controller via said first bus, and wherein said SCSI controller is configured to extract a target SCSI logical unit number from said header information, and wherein said SCSI controller selects a first one of said plurality of decoding channels to receive said first sequence of encoded audio/video data via said second bus, wherein said first one of said plurality of decoding channels is selected based upon said target SCSI logical unit number; and wherein, if said header information is not present, said host computer is configured to assign a first SCSI logical unit number in transferring said first sequence of encoded audio/video data to said SCSI controller via said first bus, and wherein said SCSI controller selects a second one of said plurality of decoding channels to receive said first sequence of encoded audio/video data via said second bus, wherein said second one of said plurality of decoding channels is selected based upon said first SCSI logical unit number.

* * * * *